UNITED STATES PATENT OFFICE.

LEO H. BAEKELAND, OF YONKERS, NEW YORK, ASSIGNOR TO GENERAL BAKELITE COMPANY, OF NEW YORK, N. Y., A CORPORATION OF NEW YORK.

POTENTIALLY-REACTIVE COMPOSITION AND PROCESS OF MAKING SAME.

1,354,154.     Specification of Letters Patent.      Patented Sept. 28, 1920.

No Drawing.      Application filed October 31, 1919. Serial No. 334,850.

*To all whom it may concern:*

Be it known that I, LEO H. BAEKELAND, a citizen of the United States, residing at Yonkers, in the county of Westchester and State of New York, have invented certain new and useful Improvements in Potentially-Reactive Compositions and Processes of Making Same, of which the following is a specification.

It is now well known that the so-called phenol resins or saliretin-type condensation products, otherwise known as novolak, may be transformed into phenolic condensation products of the infusible type, by the reaction therewith of bodies containing mobile methylene groups, such for example as formaldehyde, the polymers of formaldehyde, formaldehyde derivatives such as hexamethylenetetramin, and other equivalent substances. Such process is described and claimed in my prior U. S. Patent 1,038,475, patented Sept. 10, 1912. See also Baekeland: *Journal of Industrial and Engineering Chemistry*, August, 1909, etc.

It is also known that hexamethylenetetramin-triphenol, a crystalline substance consisting of one molecular proportion of hexamethylene united with three molecular proportions of phenol, and hereinafter more briefly called "hexatriphenol," decomposes either when boiled in aqueous solution or when moderately heated in the dry state, ammonia being evolved and a residue left which is a phenolic condensation product of the infusible type. (Lebach: *Zeit. fur Ang. Chemie*, Aug. 1909; J. S. C. I. 1913). The proportion of ammonia evolved in this decomposition is however large, and special precautions are required in order to produce a compact and technically valuable condensation product. Certain methods whereby such valuable products may be prepared from hexatriphenol are described in my prior Patent 1,187,230, patented June 13, 1916. For example, according to the said patent the decomposition of hexatriphenol may be brought about in presence of some excess of phenol above the tri-molecular proportion, or an excess of the homologs of phenol or of other substances which may enter into a solid solution in the mass.

The present invention relates to a potentially reactive composition (that is to say a composition capable of transformation into a phenolic condensation product of the infusible type) which contains hexatriphenol or its equivalents, and a phenol resin or its equivalents, or the immediate reaction products of these substances, the term phenol resin being herein applied broadly to the condensation products of the saliretin or so-called novolak type, usually but not necessarily containing more or less excess of uncombined phenol.

I have discovered that hexatriphenol, as well as equivalent methyleneamin-phenols derived from the cresols or other phenols or mixtures thereof, whether containing more or less than three molecular proportions of the phenolic body for each molecular proportion of hexamethylenetetramin, may be utilized with great advantage to supply a part or all of the methylene groups which are necessary for converting the phenol resins into potentially reactive bodies or mixtures, which are then available for the compounding of molding mixtures, the preparation of varnishes, and in general for all purposes for which such potentially reactive bodies may be used in the phenolic condensation product arts. The methyleneamin-phenol is not only capable of supplying the methylene groups necessary for the conversion of the phenol resin, but I have found it to be an excellent solvent for this resin, and the mixture or product presents the great advantages of possessing a high degree of fusibility and a most desirable plastic character. In other words the methyleneamin-phenol, in addition to its purely chemical function, greatly improves the workability of the mixtures before and during the stage when the transformation into the infusible condensation product takes place.

This beneficial effect can be still further increased by the incorporation of suitable solvents, preferably solvents of high boiling point, as for instance naphthalene, chlorinated naphthalene, phenolic esters, other esters of organic or inorganic acids, and in general such substances as have the required solvent properties, and more particularly such as may advantageously remain in the final infusible product, performing therein the function of solid solvents or plasticizing agents. When more volatile solvents are used, either alone or in conjunction with such high boiling-point solvents, they are wholly or partially expelled before or during the final hardening stage.

The invention is directly applicable to the manufacture of varnishes, solutions, lacquers, or the like, available for all of the purposes for which such varnishes, solutions or lacquers are ordinarily used in this art.

Several methods of bringing the methyleneamin-phenol and the phenol resin into reactive relation may be used. For instance, the two substances may be directly heated together at a sufficiently high temperature and for a sufficiently long time, and thus be transformed immediately into the final infusible product. This operation can be carried out either with or without increased or superatmospheric pressure, although in almost all cases, increased pressure will be of direct benefit in preventing the formation of bubbles and avoiding porosity. Not only does pressure insure a higher degree of homogeneity in the final product, but it permits a more rapid conversion by the use of higher temperatures, the pressure being in all cases sufficiently high to prevent foaming or dissociation, and, in case of pressure-molding operations, of the order required for shaping the plastic mixture.

In other cases, the application of heat under ordinary atmospheric pressure, or even under diminished pressure, might be used under certain conditions, but much greater caution will be necessary. Although this latter method of procedure is easily possible for very thin layers, such as a varnished or lacquered surface, it can be stated in general that whenever heating is done without counter-pressure, considerably greater caution is required, and in most cases, it is necessary to increase the temperature gradually, especially during the early stages of the heating process.

In many cases, it is much more desirable, after the methyleneamin-phenol is mixed with the novolak, to submit the mixture to a limited heating so as to insure either thorough mixture or a partial chemical reaction, which, however, should not proceed far enough to render the composition infusible or insoluble, so that the resulting product can be kept and stored, or variously utilized, thus permitting the utmost flexibility in the utilization of the material in any of the procedures now common in this art.

In other words, the methyleneamin-phenol and the novolak resin can be melted and mixed, or submitted to a partial reaction by heating or otherwise, to the point of forming a variety of so-called "A" or initial condensation product; that is to say, a substance which is still fusible and soluble, but which is potentially reactive, and which by further heating is transformed into the infusible product. In this way, an excellent variety of so-called solid A or solid initial condensation product can be produced. This solid A can be mixed, either during its formation or after its formation, with other desirable substances, as for instance, fillers, fibrous materials, solvents and in general, any of the numerous substances, the addition of which may become advisable for insuring some special quality, or for some particular application.

At this stage also, the resulting A or initial condensation product can be dissolved in suitable organic solvents to make a varnish or a lacquer. Or this varnish or lacquer can be made by simply dissolving suitable proportions of novolak and hexatriphenol or its equivalents in such organic solvents as are available for this purpose; for instance alcohol, acetone, mixtures of acetone and alcohol, benzol, or other hydrocarbons, or other organic solvents, or mixtures of any of these solvents with special substances, as for instance, naphthalene, chlorinated naphthalene, phenolic or other organic esters from organic or inorganic acids, or the like.

In preparing the initial condensation product as above described, the mixture of novolak resin and methyleneamin-phenol prepared in any suitable way, can be heated to such a point as to bring about a partial reaction and a partial elimination of ammonia, which is readily observable by the foaming or bubbling of the mixture and the escape of ammonia-gas. If this heating is continued too long, or at too high a temperature the whole mass becomes infusible. In order to avoid this, and to insure the proper solubility and fusibility of the initial product or potentially reactive resin, this heating should not be carried too far, and should be controlled by sufficiently rapid cooling before the mass has become infusible. This control can also be accomplished by the addition, before the final stage is reached, of solvents or other substances which, through cooling or by the act of dilution, moderate or stop the exothermic reaction.

The phenol resin to be used in accordance with this invention may comprise generally any of the varieties of so-called novolak, or saliretins, or fusible, soluble phenolic resins, whether the latter be obtained directly by the reaction of formaldehyde on phenols or by the use of the well accepted equivalents for formaldehyde, as for instance, methylene esters, paraform, hexamethylenetetramin, or other bodies containing active methylene groups and acting as practical equivalents of formaldehyde solution in the preparation of these substances. Acetaldehyde, or other aldehydes which, under proper conditions, give fusible soluble resins when reacting upon phenols, may be used in the same way. In general, these fusible novolak resins can be obtained by causing a sufficiently large proportion of hydroxybenzol, C₆H₅OH, or other suitable phenol, for instance cresols, or cresol mixtures, to react upon formaldehyde, preferably in presence of an acid, the reaction being conducted in such a way as to insure the formation of a product which can be kept in molten condition practically indefinitely without becoming infusible. Similar fusible phenolic resins, as is well known, can also be obtained without the use of acids, by reacting with formaldehyde or its equivalents on phenol under suitable conditions and in suitable proportions. (See Aylsworth, U. S. Pat. No. 1,029,737, June 18, 1912). Or again, they may be obtained by the interaction of phenol and formaldehyde or their equivalents in presence of alkaline or basic catalytic agents, provided the operation be conducted properly and the proportion of phenol used be sufficient to insure the formation of the permanently fusible resin. All such bodies as well as those mentioned below are included under the term "phenol resin" as employed herein.

In the same way, as is well known, a fusible resin can be obtained by heating a phenol with a relatively small amount of hexamethylenetetramin; for instance, by heating 11 molecular weights of ordinary phenol with 1 molecular weight of hexamethylenetetramin at a gradually rising temperature, until all or most of the ammonia has been expelled. These products can also be obtained by the resinification of certain phenol-alcohols or mixtures containing phenol-alcohols, under suitable conditions, as has been explained by De Laire (see French Patent No. 350,180; Belgian Patent No. 192,590; and British Patent No. 15,517 of 1905). Accordingly the phenol-alcohols and their dehydration products are to be regarded as equivalents for phenol resins as starting materials for the purposes of this invention.

I desire it to be well understood that I do not limit myself to a novolak or fusible phenolic resin obtained in any particular way; nor do I desire to apply the word "fusibility" in any extreme significance. Under certain conditions, some of these novolaks or fusible resins appear to become infusible, either by heating them at such a high temperature that destruction begins, or that they are charred or oxidized. My designation of fusibility here should be limited to a practical interpretation, and refers to a resin which, for all practical purposes, can be maintained in fusion for a certain length of time, (at for instance 120° or 130° C.) and which does not readily and rapidly change itself into an infusible variety of great hardness, possessing instead to a greater or lesser degree the general characteristics of natural resins, with their relative brittleness, fusibility, solubility, etc.

For instance, my process could be carried out by preparing a novolak which is on the borderland of being considered a potentially reactive resin and is capable of being transformed, to some extent, into a less fusible or even infusible variety (but rather soft when warm and relatively brittle when cold) if heated long enough and at a sufficiently high temperature. The distinction will be readily understood by those who possess a practical familiarity with these bodies.

The method of operating can be widely varied. For instance, if the substance is to be used for cast-molding, the fusible product resulting from the mixture of novolak and methyleneamin-phenol can simply be poured into suitable molds or containers, in which afterward it is submitted to the hardening operation by the proper application of heat, or of heat and pressure. If the substance is to be used as a component of a molding compound, it is mixed, after well known methods, either by grinding or by kneading on rollers with fibrous or other filling materials and converted either into powder or granular form, or into sheets, or into any preliminary form whatsoever, and is then molded either in the cold press and afterward submitted to heat, with or without pressure; or alternatively it is molded directly in a hot hydraulic or other press provided with the necessary devices for heating during the operation of molding.

The addition of these extraneous substances or filling materials may also be made before the novolak is mixed with the methyleneamin-phenol, or at any stage whatsoever of the process before the final hardening. These various manipulations are now well understood in this art.

The same remarks apply to the utilization of the reactive resin or mixture as a varnish, or a lacquer, or in the further manufacture of so-called composite cardboard, or the impregnation of porous bodies, or the manufacture of special cements.

Having thus set forth in general terms certain of the preferred methods for utilizing my invention, it will be understood that the matter of proportions of the methyleneamin-phenol to the novolak, or fusible phenol resin, depends very much on the results which are sought to be obtained as well as upon the particular quality of the phenol resin. For instance, if a novolak is of the so-called harder variety, that is to say, difficultly fusible, then relatively small amounts of hexatriphenol added thereto will suffice, especially if used in conjunction with other plasticizing agents. For instance, 100 parts of novolak, or fusible phenol resin, and 5 parts of hexatriphenol may yield a reactive resin or mixture. In most cases, however, it is necessary to use decidedly larger proportions of hexatriphenol, for instance, quantities varying from 10 to 300 parts of hexatriphenol for 100 parts of novolak. In some cases, the proportion of hexatriphenol may even be larger. For casting transparent articles, for example, 30 to 40 parts of hexatriphenol for each 100 parts of novolak is a satisfactory proportion, although even for this use the proportion of hexatriphenol may be greatly increased, even to the point of predominating over the novolak. For this particular application, in case a good color is desired, it is desirable to make a novolak which is practically colorless; such a product can easily be obtained by using pure chemicals and by preventing oxidation. For molding mixtures, similar proportions are advantageous, more particularly those of about 40 parts of hexatriphenol for 100 parts of novolak, and the resulting mixture or initial product can then be mixed in the usual manner and in the usual proportions with appropriate filling materials, as for instance, about equal parts of wood flour, with or without the addition of suitable solvents or other desirable modifying or plasticizing agents, as set forth above.

It is well understood that the hexatriphenol to be used in accordance with this invention may be either the pure product obtained by repeated crystallization from watery or other solutions, or it may be the less pure or even the crude product obtained by the admixture of phenol, formaldehyde and ammonia in suitable proportions which need not correspond rigidly to the theoretical reacting proportions. The hexatriphenol thus produced may be dried before being mixed with the novolak which may also be thoroughly dehydrated; or in order to simplify matters it may be used while still moist, or even in aqueous or other solution, although for higher grade products it is usually desirable to employ the carefully purified product. For most ordinary applications, it does not matter if there is some small amount of free phenol in excess. In this case, the effect of the latter will be to) increase somewhat further the plasticity.

Instead of using hexatriphenol obtained from ordinary crystalline phenol, $C_6H_5OH$, similar or corresponding addition products derived from other phenolic bodies may be used as equivalents therefor, for instance the corresponding cresol products, and products from di- and other poly-phenols, in which case the properties of the resulting products and the behavior of the substance during the process, will be more or less influenced thereby, with respect to the general characteristics of plasticity, speed of reaction, and the relative degree of fusibility and solubility, or of infusibility and insolubility.

Hexatriphenol is not merely capable of replacing hexamethylenetetramin, formaldehyde and the like in the so-called two-stage process of making phenolic condensation products of the infusible type (Baekeland Patent 1,038,475) above referred to but it presents certain specific advantages for this purpose. For example, it is more readily and suickly purified by crystallization from aqueous solutions than is hexamethylenetetramin, on account of the rather wide difference in its solubility in hot and cold water. Also, it is not necessary to adjust with accuracy the proportions of the original raw materials phenol, formaldehyde and ammonia, since the definite crystalline body hexatriphenol forms readily in presence of a decided excess of either phenol or hexamethylenetetramin. Furthermore, the reactions involved in the transformation of molding mixtures prepared from hexatriphenol and novolak are highly exothermic, and contribute strongly to obtaining and maintaining the proper temperature in the molding operation: this applies not only to the reaction between the hexatriphenol and the novolak but also to the internal reaction, above mentioned, whereby the hexatriphenol itself yields condensation products of the infusible type.

I claim:—

1. Process of making a potentially reactive composition, comprising intimately commingling a phenol resin and a methyleneamin-phenol in proportion to yield by reaction a phenolic condensation product of the infusible type.

2. Process of making a potentially reactive composition, comprising intimately commingling a phenol resin and a methyleneamin-phenol in proportion to yield by reaction a phenolic condensation product of the infusible type, effecting a limited reaction between said components, and arresting the reaction before the infusible stage is reached.

3. Process of making a potentially reactive varnish or similar composition, comprising dissolving in an appropriate solvent a phenol resin and a methyleneamin-phenol in proportion to yield by reaction a phenolic condensation product of the infusible type.

4. Process of making a potentially reactive composition, comprising intimately commingling a phenol resin and hexamethylenetetramin-triphenol in proportion to yield by reaction a phenolic condensation product of the infusible type.

5. Process of making a potentially reactive composition, comprising initmately commingling a phenol resin and hexamethylenetetramin-triphenol in proportion to yield by reaction a phenolic condensation product of the infusible type, effecting a limited reaction between said components, and arresting the reaction before the infusible stage is reached.

6. Process of making a potentially reactive varnish or similar composition, comprising dissolving in an appropriate solvent a phenol resin and hexamethylenetetramin-triphenol in proportion to yield by reaction a phenolic condensation product of the infusible type.

7. A potentially reactive composition containing a phenol resin and a methyleneamin-phenol.

8. A potentially reactive composition containing a phenol resin, a methyleneaminphenol and a solvent.

9. A potentially reactive composition containing a phenol resin, a methyleneaminphenol and a solvent capable of increasing the plasticity of the infusible product.

10. A potentially reactive molding mixture containing a phenol resin, a methyleneamin-phenol, and a filling material.

11. A potentially reactive molding mixture containing a phenol resin, a methyleneamin-phenol, a filling material and a plasticizing ingredient.

12. A potentially reactive composition containing a phenol resin and hexamethylenetetramin-triphenol.

13. A potentially reactive composition containing a phenol resin, hexamethylenetetramin-triphenol and a solvent.

14. A potentially reactive composition containing a phenol resin, hexamethylenetetramin-triphenol and a solvent capable of increasing the plasticity of the infusible product.

15. A potentially reactive molding mixture containing a phenol resin, hexamethylenetetramin-triphenol and a filling material.

16. A potentially reactive molding mixture containing a phenol resin, hexamethylenetetramin-triphenol, a filling material and a plasticizing ingredient.

In testimony whereof, I affix my signature.

LEO H. BAEKELAND.